(12) United States Patent
Pierce

(10) Patent No.: US 12,060,682 B2
(45) Date of Patent: Aug. 13, 2024

(54) LAMINATED STRUCTURE AND METHOD OF ITS PRODUCTION

(71) Applicant: Celwise AB, Norrköping (SE)

(72) Inventor: David Pierce, Norrköping (SE)

(73) Assignee: Celwise AB, Norrköping (SE)

(*) Notice: Subject to any disclaimer, the term of this patent is extended or adjusted under 35 U.S.C. 154(b) by 417 days.

(21) Appl. No.: 17/261,136

(22) PCT Filed: Jul. 19, 2019

(86) PCT No.: PCT/EP2019/069496
§ 371 (c)(1),
(2) Date: Jan. 18, 2021

(87) PCT Pub. No.: WO2020/016407
PCT Pub. Date: Jan. 23, 2020

(65) Prior Publication Data
US 2021/0292974 A1    Sep. 23, 2021

(30) Foreign Application Priority Data
Jul. 19, 2018 (SE) .................................. 1850921-6

(51) Int. Cl.
*B32B 23/10*    (2006.01)
*B31B 50/72*    (2017.01)
(Continued)

(52) U.S. Cl.
CPC ................ *D21J 3/12* (2013.01); *B31B 50/72* (2017.08); *B32B 3/06* (2013.01); *B32B 7/05* (2019.01); *B32B 23/10* (2013.01); *B65D 65/40* (2013.01); *D21J 3/00* (2013.01); *D21J 7/00* (2013.01); *B31B 2120/404* (2017.08); *B32B 2262/062* (2013.01); *B32B 2307/7163* (2013.01);
(Continued)

(58) Field of Classification Search
CPC ............ B32B 23/06; B32B 2307/7163; B32B 2250/02; B32B 23/00; D21J 3/00; D21J 3/12
USPC .......................................... 493/101
See application file for complete search history.

(56) References Cited

U.S. PATENT DOCUMENTS 1,902,760 A    3/1933  Chase
3,185,371 A *  5/1965  Reifers ..................... D21J 3/00
                                                         D9/425

(Continued)

FOREIGN PATENT DOCUMENTS

EP    0892109 A1    1/1999
EP    2004517 B1    4/2015
(Continued)

OTHER PUBLICATIONS

Swedish Office Action for Swedish Application No. 1850921-6, mailed Jun. 21, 2021, (8 pages).
(Continued)

*Primary Examiner* — Jacob A Smith
(74) *Attorney, Agent, or Firm* — Kagan Binder, PLLC

(57) ABSTRACT

The present disclosure provides a laminated biodegradable product, comprising a first functional layer in the form of a three-dimensional molded pulp structure, a functional second layer of a cellulose based material, and an overlap region, in which the first layer and the second layer overlap each other and are connected to each other.

20 Claims, 9 Drawing Sheets

(51) Int. Cl.
  B32B 3/06 (2006.01)
  B32B 7/05 (2019.01)
  B65D 65/40 (2006.01)
  D21J 3/00 (2006.01)
  D21J 3/12 (2006.01)
  D21J 7/00 (2006.01)
  B31B 120/40 (2017.01)

(52) U.S. Cl.
  CPC ............ *B32B 2307/7244* (2013.01); *B32B 2307/7246* (2013.01); *B32B 2439/70* (2013.01)

(56) References Cited

U.S. PATENT DOCUMENTS

| | | | |
|---|---|---|---|
| 3,657,044 A | | 4/1972 | Singer |
| 3,682,365 A | * | 8/1972 | Reifers .................... B65D 1/34 |
| | | | 229/407 |
| 3,698,623 A | * | 10/1972 | Bixler .................... B65D 1/34 |
| | | | 229/407 |
| 3,894,679 A | | 7/1975 | Reifers et al. |
| 5,473,121 A | | 12/1995 | Urya |
| 5,679,421 A | | 10/1997 | Brinton, Jr. |
| 9,187,866 B2 | | 11/2015 | Sunblad et al. |
| 10,767,313 B2 | | 9/2020 | Kuo et al. |
| 2001/0000742 A1 | | 5/2001 | Karhuketo et al. |
| 2002/0060004 A1 | | 5/2002 | Koike |
| 2003/0136537 A1 | | 7/2003 | Frederiksen et al. |
| 2004/0013830 A1 | | 1/2004 | Nonomura et al. |
| 2004/0043168 A1 | | 3/2004 | Ishikawa et al. |
| 2004/0105941 A1 | | 6/2004 | Terada et al. |
| 2004/0248486 A1 | | 12/2004 | Hodson |
| 2009/0057958 A1 | | 3/2009 | Anghileri et al. |
| 2009/0265875 A1 | | 10/2009 | Clamp et al. |
| 2010/0330312 A1 | | 12/2010 | Stockhaus |
| 2011/0139660 A1 | | 6/2011 | Cabell et al. |
| 2015/0266659 A1 | | 9/2015 | Roth |
| 2016/0014520 A1 | | 1/2016 | Miura et al. |
| 2016/0122108 A1 | | 5/2016 | Lynch |
| 2018/0171561 A1 | | 6/2018 | Sunblad et al. |
| 2019/0009961 A1 | | 1/2019 | Ochsmann et al. |
| 2019/0016094 A1 | | 1/2019 | Ochsmann et al. |
| 2019/0193323 A1 | | 6/2019 | Nilsson |
| 2019/0255828 A1 | | 8/2019 | Ochsmann et al. |
| 2019/0389184 A1 | | 12/2019 | Heinze |
| 2020/0055657 A1 | | 2/2020 | Jonsson |
| 2020/0131710 A1 | | 4/2020 | Kuiper et al. |
| 2020/0147927 A1 | | 5/2020 | Bothor et al. |
| 2020/0147942 A1 | | 5/2020 | Reisert et al. |
| 2020/0181849 A1 | | 6/2020 | Esgueva Gutierrez et al. |
| 2020/0223199 A1 | | 7/2020 | Bothor et al. |

FOREIGN PATENT DOCUMENTS

| | | | | |
|---|---|---|---|---|
| EP | 3266608 | A1 | | 1/2018 |
| EP | 3266608 | A1 | * | 1/2018 ............ B32B 23/00 |
| EP | 3204555 | B1 | | 8/2018 |
| GB | 464436 | A | | 4/1937 |
| GB | 687292 | A | | 2/1953 |
| GB | 2450872 | A | | 1/2009 |
| JP | H08197553 | A | | 8/1996 |
| JP | 2001122240 | A | | 5/2001 |
| JP | 2002128075 | A | | 5/2002 |
| JP | 2003013391 | A | | 1/2003 |
| JP | 2003103692 | A | | 4/2003 |
| JP | 2012077420 | A | | 4/2012 |
| JP | 2013129921 | A | | 7/2013 |
| JP | 2014144613 | A | | 8/2014 |
| TW | D109229 | S1 | | 2/2006 |
| WO | 9400163 | A1 | | 1/1994 |
| WO | 0174564 | A1 | | 10/2001 |
| WO | 2006057609 | A1 | | 6/2006 |
| WO | 2007111567 | A1 | | 10/2007 |
| WO | 2009136783 | A1 | | 11/2009 |
| WO | 2011159240 | A1 | | 12/2011 |
| WO | 2013173434 | A1 | | 11/2013 |
| WO | 2015042874 | A1 | | 4/2015 |
| WO | 2016067285 | A1 | | 5/2016 |
| WO | 2016101976 | A1 | | 6/2016 |
| WO | 2017089506 | A1 | | 6/2017 |
| WO | WO-2017179740 | A1 | * | 10/2017 ............ B32B 23/06 |
| WO | 2018050788 | A2 | | 3/2018 |
| WO | WO-2018050788 | A2 | * | 3/2018 ............ B29B 17/00 |

OTHER PUBLICATIONS

Epacenet Abstract for JP2002128075.
Communication Pursuant to Article 94(3) EPC for European Application No. 19742576.2, mailed Jun. 22, 2022, (6 pages).
E-Space net English Abstract and machine Translation for Jp H08197553 A.
E-Space net English Abstract and machine Translation for JP 2003013391 A.
E-Space net English Abstract and machine Translation for JP 2013129921 A.
Data Sheets for NatureFlexTM NP, NatureFlexTM NPF, NatureFlexTM NVS, and NatureFlexTM NVR, Retrieved from http://www.futamuragroup.com/en/divisions/cellulose-films/products/natureflex/uncoated/, on Dec. 22, 2020, (2 pages).
International Search Report for International Application No. PCT/EP2019/069496, mailed Oct. 4, 2019, (2 pages).
Transmittal of copy of International Preliminary Report on Patentability (IPRP) for International Application No. PCT/EP2019/069496, mailed Jan. 28, 2021, (7 pages).
Swedish Search Report for Swedish Application No. 1850921-6, mailed Feb. 21, 2019, (8 pages).
E-Space English Abstract for JP 2003103692 A.
E-Space English Abstract for JP 2001122240 A.
E-Space English Abstract for JP 2012077420 A.
E-Space English Abstract for JP 2014144613 A.

* cited by examiner

LAMINATED STRUCTURE AND METHOD OF ITS PRODUCTION

CROSS-REFERENCE TO RELATED APPLICATIONS

This application claims priority to International Application No. PCT/EP2019/069496, filed Jul. 19, 2019 and titled "LAMINATED STRUCTURE AND METHOD OF ITS PRODUCTION," which in turn claims priority from a Swedish Patent Application having serial number 1850921-6, filed Jul. 19, 2018, titled "LAMINATED STRUCTURE AND METHOD OF ITS PRODUCTION," both of which are incorporated herein by reference in their entireties.

TECHNICAL FIELD

The present disclosure relates to a laminated product and a method of producing it, the structure comprising at least one layer of a three-dimensionally molded pulp product and at least one layer of a cellulose film.

The laminated product is particularly suited for use in the packaging, distribution and presentation products which require packaging with additional strength, moisture barrier or gas barrier. A particular field of application is for food products and for beverages.

BACKGROUND

From WO2016101976A1 there is known a method of producing products from a pulp slurry by applying the slurry layer to a porous mold and removing water from the slurry by simultaneously heating and pressing the slurry layer while drawing a vacuum through a mold wall, the other side of which being in contact with the slurry layer.

As is disclosed in WO2016101976A1, the molding process may be performed in two or more successive pressing steps, which is advantageous as it shortens cycle time and thus increases the throughput of the production process, as compared to a process with a single pressing step.

In products that are to be used for packaging, it is sometimes desirable to provide increased strength in, all or part of, the product.

Moreover, in products that are to be used for packaging, it is sometimes desirable to provide a barrier to e.g. moisture or gases, such as oxygen.

Furthermore, in some applications, there is a desire to provide a portion that is see-through, such that the product contained therein is readily visible.

Finally, there is a need for packaging products which are recyclable and/or biodegradable.

SUMMARY

An object of the present disclosure is to provide a biodegradable product having enhanced strength and/or barrier properties, or which is see-through.

The invention is defined by the appended independent claims, with embodiments being set forth in the appended dependent claims, in the following description and in the attached drawings.

According to a first aspect, there is provided a laminated biodegradable product, comprising a first functional layer in the form of a three-dimensional molded pulp structure, a functional second layer of a cellulose based material, and an overlap region, in which the first layer and the second layer overlap each other and are connected to each other.

A functional layer is a layer that provides a technical function in the product, as opposed to one merely providing decorative or information function.

A three-dimensional molded pulp product is a product that has been molded from pulp directly into three-dimensional shape. Hence, a paper or cardboard sheet that has been converted into a three-dimensional shape is not to be regarded as a three-dimensional molded pulp product.

The first and second layers may be permanently connected (in the sense that disconnection is not possible without destroying the structure) to each other. For example, this may be achieved by a permanent glue, adhesive or other type of bonding, or it may be achieved through a one-way (non-reversible) mechanical connection.

A product as per the above can be formed so as to provide one or more of a variety of desirable properties, including strength, gas and/or liquid impermeability and partial transparency.

The first and second layers may be connected by positive interlocking.

For example, the layers may be connected by folding part of one of the layers over a part of the other layer. Alternatively, a mechanical locking device may be provided, preferably integrated with one of the layers.

The first and second layers may be connected by adhesion.

For example, the layers may be connected by an adhesive film, by glue and/or by using a hotmelt. As another alternative, and in particular where the second layer allows for it, adhesion may be achieved based on a hydrogen bond or based on fiber bonding, as may be the case between cellulose film and pulp. As may also be the case between two pulp layers.

In the case where a cellulose film is used and the bonding is achieved through fiber or hydrogen bond, the overlap region may consist essentially of the first pulp layer, the second layer and the third layer (if any).

That is, the overlap region does not need to contain any effective adhesive, since the cellulose film and the pulp will bond to each other as water is removed during the forming process.

The laminated product may further comprise a second overlap region, in which the first layer and the second layer overlap each other and are non-connected to each other.

Consequently, at the second overlap region, the first and second layers may overlap each other and not be permanently connected to each other.

At the second overlap region, the first and second layers may be completely or partly in contact with each other. For example, the first and second layers may abut on each other over the whole second overlap region, or a portion of the second overlap region.

Alternatively, at the second overlap region, the first and second layers may be completely or partly spaced apart.

The overlap region, in which the first layer and the second layer overlap each other and are connected to each other, and the second overlap region, may together present a total overlap region.

The overlap region, in which the first layer and the second layer overlap each other and are connected to each other, may correspond to less than 30% of the total overlap region, preferably less than 20%, more preferably less than 10% or less than 5% of the total overlap region.

The second layer may be a film.

The film may be selected from a group consisting of a coated cellophane film, an uncoated cellophane film, a coated cellophane film, a polymer film and a paper sheet.

The second layer may form a surface barrier on at least part of the first layer.

Hence, the second layer may be exposed to at least 50%, preferably at least 70% or at least 90% of its surface area. Such exposed surface area may entirely overlap the first pulp layer.

The laminated product may present a portion of no overlap between the second layer and the first layer.

Hence, at least 50% of the second layer may be free from overlap with any of the first layer, preferably at least 60% or at least 70%.

The second layer may be three-dimensionally molded.

This may be used to provide increased strength and/or a moisture barrier.

In another group of embodiments, the second layer may be a second three-dimensional molded pulp layer.

A third layer in form of a film may be provided.

The film may be selected from a group consisting of a coated cellophane film, an uncoated cellophane film, a coated cellophane film, a polymer film and a paper sheet.

The first and second layers may be connected as described above. For example, the pulp layers may be connected by a bonding achieved through fiber or hydrogen bond. Thus, the overlap region may consist essentially of the first pulp layer, the second pulp layer and the third layer (if any).

That is, the overlap region does not need to contain any effective adhesive, since the pulp layers, and alternatively or additionally, at least one pulp layer and a cellulose film, will bond to each other as water is removed during the forming process.

The third layer may at least partially overlap at least one of the first and second molded pulp layers.

The third layer may be sandwiched between the first and second layers. In some embodiments, the third layer may be sandwiched between the first and second layers over its entire extent. In other embodiments, the third layer may partially overlap one or both layers and be partially exposed, e.g. in order to provide a window, or the like.

The first and second layers may completely cover the third layer.

The third layer may be exposed. Depending on application, the third one or both faces of the third layers may be exposed.

The third layer may form a surface barrier on at least part of at least one of the pulp layers.

Hence, the third layer may be exposed to at least 50%, preferably at least 70% or at least 90% of its surface area. Such exposed surface area may entirely overlap the first and/or second pulp layers.

The laminated product may present a portion of no overlap between the third layer and any of the pulp layers.

Hence, at least 50% of the third layer may be free from overlap with any of the first and second pulp layers, preferably at least 60% or at least 70%.

In one group of embodiments, the first and second layers may be produced as separate parts and joined together.

That is, the first and second layers are separate parts which are joined together.

In another group of embodiments, the first and second layers may be produced as a portions of a single part, which is deformed so as to form the laminated product.

That is, the first and second layers are portions of a single part, which is deformed so as to form the laminated product.

For example, the part may be folded so as to form the laminated product.

The first and second layers may be pressed together.

The third layer may be three-dimensionally molded.

A space may be provided between the first and second layers, said space preferably having a thickness that is 1-200% of a thickness of the thickest one of the first and second layers, preferably 10-150%.

Hence with a thickness of a pulp layer normally being on the order of 0.3-1.2 mm, preferably 0.5-1 mm, the space will be on the order of 0.003-2.4 mm, preferably 0.005-2 mm, or even 0.05-1.5 mm. In most applications, the space will be 0.2-1.5 mm.

The space may be provided to enhance thermal insulation properties of the product and/or in order to interrupt capillary leakage.

The laminated product may further comprise at least one spacer, which is spaced from an edge portion of at least one of the first and second layers.

The spacer may be integrated with the laminated product. For example, it may be formed in one piece with one of the first and second layers, e.g. as a protrusion from a surface of one of the layers that is designed to face a surface of the other one of the layers. As yet another option, the spacer may be provided as a separate part that is attached, such a glued or otherwise adhered, to at least one of the layers. Another option is to provide the spacer by applying a glue, hotmelt or other extrudable product and allow it to cool, dry or set such that it provides the spacer.

Preferably, a plurality of spacers may be provided and distributed over the overlap region. The number of spacers and their positions may depend on what forces the product is intended to be able to carry while maintain the space.

The spacers may be provided as one or more protrusions (i.e. by embossing) and/or as one or more depressions or recessed areas (i.e. by debossing).

According to a second aspect, there is provided a laminated biodegradable product, comprising a first functional layer in the form of a three-dimensional molded pulp structure, a functional second layer, an overlap region, in which the first layer and the second layer overlap each other and are connected to each other, wherein the second layer is a film, wherein the laminated product presents a portion of no overlap between the second layer and the first layer.

The first and second layers may be permanently connected (in the sense that disconnection is not possible without destroying the structure) to each other. For example, this may be achieved by a permanent glue, adhesive or other type of bonding, or it may be achieved through a one-way (non-reversible) mechanical connection.

At least 50% of the second layer may be free from overlap with any of the first layer, preferably at least 60% or at least 70%.

A product as per the above can be formed so as to provide one or more of a variety of desirable properties, including strength, gas and/or liquid impermeability and partial transparency.

The film may be of a cellulose based material.

The first and second layers may be connected by positive interlocking.

For example, the layers may be connected by folding part of one of the layers over a part of the other layer. Alternatively, a mechanical locking device may be provided, preferably integrated with one of the layers.

The first and second layers may be connected by adhesion.

For example, the layers may be connected by an adhesive film, by glue and/or by using a hotmelt. As another alternative, and in particular where the second layer allows for it, adhesion may be achieved based on a hydrogen bond or based on fiber bonding, as may be the case between cellulose film and pulp.

In the case where a cellulose film is used and the bonding is achieved through fiber or hydrogen bond, the overlap region may consist essentially of the first pulp layer, the second layer and the third layer (if any).

That is, the overlap region does not need to contain any effective adhesive, since the cellulose film and the pulp will bond to each other as water is removed during the forming process.

The second layer may form a surface barrier on at least part of the first layer.

Hence, the second layer may be exposed to at least 50%, preferably at least 70% or at least 90% of its surface area. Such exposed surface area may entirely overlap the first pulp layer.

The second layer may be three-dimensionally molded.

This may be used to provide increased strength and/or a moisture barrier.

According to a third aspect, there is provided a method of producing a laminated biodegradable product, comprising providing a first three dimensionally molded functional pulp layer, providing a second functional layer of a cellulose based material, arranging the first and second layers so as to at least partially overlap, and connecting the first and second layers to each other.

Joining the first and second layers may comprise positively interlocking portions of the first and second layers.

Alternatively, or as a supplement, joining the first and second layers may comprise adhering the first and second layers to each other.

The adhering may be achieved based on a hydrogen bond or on fiber bonding.

Arranging the first and second layers so as to at least partially overlap, may comprise arranging the first and second layers to present a first overlap region wherein the first and second layers are connected to each other, and a second overlap region wherein the first and second layers are non-connected.

The first overlap region and the second overlap region may together present a total overlap region.

The first overlap region may correspond to less than 30% of the total overlap region, preferably less than 20%, more preferably less than 10% or less than 5% of the total overlap region.

The second layer may be a film.

The method may further comprise arranging the first and second layers so as the laminated product presents a portion of no overlap between the second layer and the first layer.

Alternatively, the second layer may be provided in the form of a second three-dimensional molded pulp layer.

The method may further comprise providing a space between the first and second layers, said space preferably having a thickness that is 1-200 of a thickness of the thickest one of the first and second layers, preferably 10-150%.

The method may further comprise providing at least one spacing element, which is spaced from an edge portion of at least one of the first and second layers.

The method may further comprise providing a third layer in the form of a film, wherein said third layer at least partially overlaps at least one of the first and second molded pulp layers.

The method may further comprise arranging the third layer to be sandwiched between the first and second layers.

The method may further comprise arranging the first and second layers to completely cover the third layer.

The method may further comprise arranging the first and second layers such that the third layer is exposed.

The method may further comprise arranging the third layer to form a surface barrier on at least part of at least one of the pulp layers.

The first and second layers may be produced as separate parts and joined together.

Alternatively, the first and second layers may be produced as portions of a single part, which is deformed so as to form the laminated product.

The first and second layers may be pressed together.

The method may further comprise three-dimensionally molding the third layer.

Providing the first layer may comprise applying a wet pulp material to a porous forming surface of a first mold part of a first mold.

Providing the second layer may comprise applying a wet pulp material to a porous forming surface of a first mold part of a second mold.

Alternatively, providing the second layer may comprise applying a transparent cellulose film sheet to at least partially overlap and contact the pulp material, and wherein connecting the first and second layers comprises forming the product by pressing the cellulose film sheet and the pulp between the first mold part and a second mold part while heating at least one of the mold parts and/or drawing vacuum through at least one of the mold parts, so as to evacuate water from the product.

A wet pulp material is defined as a pulp material containing at least 10% water by weight.

The cellulose film sheet may be applied to the first mold part prior to application of the pulp material to the first mold part.

Alternatively, the cellulose film sheet may be applied to the first mold part after application of the pulp material.

The method may further comprise selectively applying the wet pulp material to an active forming surface of a mold, such that a first portion of the active forming surface is essentially free from pulp and a second portion of the active forming surface presents a continuous layer of the wet pulp material.

This mold may be the mold of the pickup tool. In such case part of the mold may be masked to prevent it from picking up pulp. As another option, the vacuum applied through the first portion of the mold may be reduced or eliminated, e.g. by a separate vacuum connection to that part of the mold or by a reduced or eliminated porosity of that part of the mold.

Alternatively, or as a supplement, this mold may be a first, second, third or fourth forming mold, in which a further preformed but wet pulp layer is applied to an already partially formed product.

In the method, a vacuum level at the rear side of the forming face of the mold or mold part may be 50-99 kPa, preferably 65-85 kPa.

In the method, the forming face of the mold or mold part may be heated to about 150-500° C., preferably 150-400° C., 200-500° C., 200-400° C. or 200-300° C.

In the method, the pulp may be pressed against a forming face of the mold or mold part with a pressure of about 390-1570 kPa, preferably 580-1170 kPa.

In the method, the pulp may be pressed against the forming face of the mold or mold part during a pressing time of 0.1-4.0 second, preferably 0.5-2.0 second.

The forming may be a first forming step, wherein an initial water content of the pulp is 70-90% by weight and wherein a final water content is 45-65% by weight, preferably about 50-60% by weight.

Moreover, the method may comprise a forming step, which is a second forming step, wherein an initial water content of the pulp is about 45-65%, preferably about 50-60% by weight, and wherein a final water content is about 25-40% by weight, preferably about 30-35% by weight.

Moreover, the method may comprise a forming step, which is a third forming step, wherein an initial water content of the pulp is about 25-45% or 25-40% by weight, preferably about 30-40% or 30-35% by weight, and wherein a final water content is less than about 5% by weight, preferably less than about 1% by weight.

The method may further comprise at least one step of pre-forming at least part of the product by pressing at least some of the pulp between a first preforming mold part and a second preforming mold part, while heating at least one of the preforming mold parts and/or drawing vacuum through at least one of the preforming mold parts, so as to evacuate water from the product.

Moreover, the method may further comprise at least one step of post-forming at least part of the product by pressing at least some of the pulp between a first post-forming mold part and a second post-forming mold part, while heating at least one of the post-forming mold parts and/or drawing vacuum through at least one of the post-forming mold parts, so as to evacuate water from the product.

A final water content may differ by at least 5% by weight, preferably at least 10% or at least 20% between a pair of juxtaposed portions of the first layer.

Hence, it is possible to provide a portion of the first layer (and/or second layer, if any) which has a higher water content, that may be suitable to provide adhesion to another pulp layer or to a cellulose film.

According to a fourth aspect, there is provided a method of producing a laminated biodegradable product, comprising providing a first three dimensionally molded functional pulp layer, providing a second functional layer, wherein the second layer is a film, arranging the first and second layers so as to at least partially overlap and so as the laminated product presents a portion of no overlap between the second layer and the first layer, and connecting the first and second layers to each other.

The film may be of a cellulose based material.

Joining the first and second layers may comprise positively interlocking portions of the first and second layers.

Alternatively, or as a supplement, joining the first and second layers may comprise adhering the first and second layers to each other.

The first and second layers may be produced as separate parts and joined together.

The method may further comprise three-dimensionally molding the film layer.

According to a fifth aspect, there is provided a locking device, which is formed in one piece of a pulp material, the locking device comprising as seen from an outermost portion of the locking device and towards a center thereof, an outer generally concave portion, a generally convex portion, connecting to the outer concave portion and arranged closer to the center than the outer concave portion, and an inner generally concave portion, connecting to the convex portion and arranged at the center, wherein the inner concave portion is flexible and at least one of the outer concave portion and the convex portion is plastically deformable.

The convex and concave portions may be juxtaposed in at least one direction perpendicular to a lamination direction, i.e. a direction towards which the locking device is operable.

The inner concave portion may present a greater depth than the outer concave portion.

The inner concave portion may present a width which is greater than the convex portion, preferably 150-300% of that of the convex portion.

The convex portion may present a width which is 80-150% of that of the outer concave portion.

The convex portion may present a depth that is 80-200% of that of the outer concave portion, preferably 90-150%.

According to a sixth aspect, there is provided a three-dimensionally molded product of pulp material, comprising a locking device as described above, wherein the locking device is formed in one piece with the three-dimensionally molded product.

Such locking device may be used to mechanically connect a pair of adjacent layers.

According to a seventh aspect, there is provided a system comprising the three-dimensionally molded product defined above, and a second three-dimensionally molded product having a through hole, wherein a depth of at least one of the outer convex portion and the concave portion, as seen in a locking direction, is greater than a distance, in a direction perpendicular to the locking direction, between a pivot point of the outer concave portion and an edge of the through hole closest to the pivot point.

BRIEF DESCRIPTION OF THE DRAWINGS

Embodiments of the present solution will now be described, by way of example, with reference to the accompanying schematic drawings in which.

DETAILED DESCRIPTION

Figure 1A:
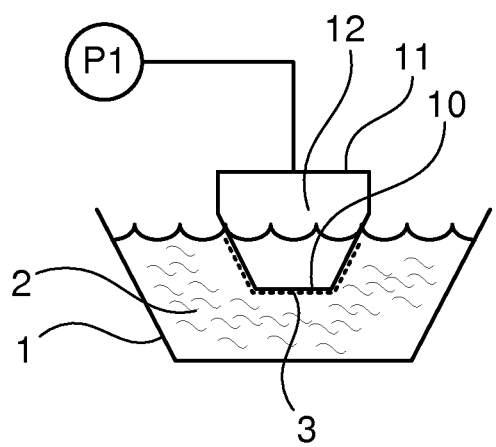
FIG 1a schematically illustrates a pickup tool which is partially immersed in a container holding a pulp slurry.

FIG. 1a schematically illustrates a pickup tool 1 which is partially immersed in container 1 holding a pulp slurry 2. The pickup tool is mounted to a tool holder 11, which together with the pickup tool defines a vacuum chamber 12 that is connected to a pressure regulator P1. The pressure regulator may have the capability of selectively generating an at least partial vacuum (i.e. air pressure lower than ambient air pressure) and/or an air pressure greater than ambient air pressure.

While the pickup tool is immersed in the pulp slurry 2, the pressure regulator P1 may generate a vacuum, causing pulp fibers 3 to stick to a product face of the pickup tool 10.

Figure 1B:
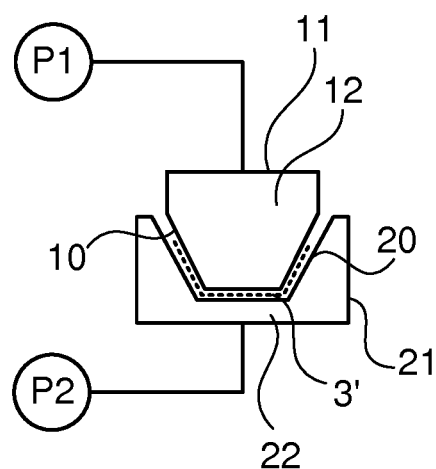
FIG. 1b schematically illustrates the pickup tool transferring the pulp fibers to a transfer tool.

FIG. 1b schematically illustrates the pickup tool 10 transferring the pulp fibers 3 to a transfer tool 20. The transfer tool may be connected to a second pressure regulator P2, which is capable of generating a vacuum or an air pressure. The transfer tool may also be mounted on a transfer tool holder 21 so as to define a vacuum chamber 22, which is connected to the second pressure regulator.

During the transfer of the pulp fibers 3 from the pickup tool to the transfer tool, an air pressure greater than ambient pressure may be generated by the first pressure regulator P1 to cause the pulp fibers to release from the pickup tool.

Alternatively, or as a supplement, a vacuum may be generated by the second pressure regulator P2, causing the pulp fibers to be received by the transfer tool 20.

Figure 1C:
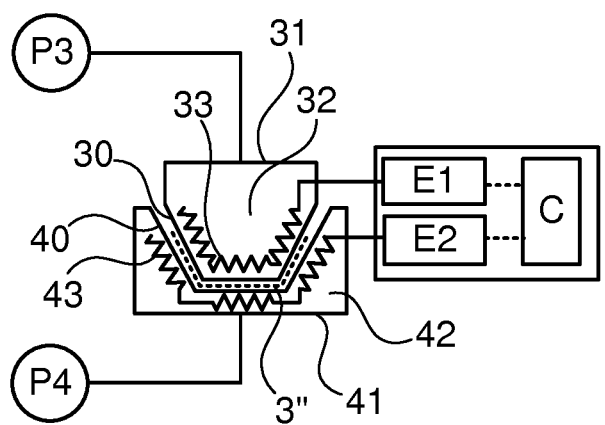
FIG. 1c schematically illustrates a pressing arrangement comprising a male pressing tool 30 and a female pressing tool.

FIG. 1c schematically illustrates a pressing arrangement comprising a male pressing tool 30 and a female pressing tool 40. One, or both, of the pressing tools may be mounted on a respective tool holder 31, 41 and be connected to a respective vacuum chamber 32, 42. The vacuum chambers may be connected to a respective pressure regulator P3, P4.

One, or both, of the pressing tools may be provided with a heating element 33, 43, energized by an energy supply E1, E2 and optionally controlled by a controller C. The heating may be achieved by electric heating elements, hot air or liquid or induction.

The pressing tools and their associated tool holders may be movable relative one another between an open position, wherein a partially molded pulp product may be inserted, and a pressing position, wherein the pressing tools are forced towards each other thus pressing the product 3" between product faces of the respective tool 30, 40.

When in the pressing position, heat may be supplied by one, or both, of the heaters 33, 43.

During the pressing step, one or both pressure regulators P3, P4 may provide a vacuum to assist in the evacuation of water vapor from the product 3".

As an alternative, one of the pressure regulators may provide a vacuum while the other one provides a pressure greater than the ambient air pressure.

Optionally, hot air or steam may be introduced through the molds during the pressing process (FIG. 1c).

It is noted that two or more successive pressing steps may be used, e.g. to gradually form all or parts of the product 3" and/or to apply additional features to the product, such as coatings, decors and the like.

In one embodiment, steps are performed in accordance with what has been described with respect to FIGS. 1a, 1b and 1c.

Figure 2:
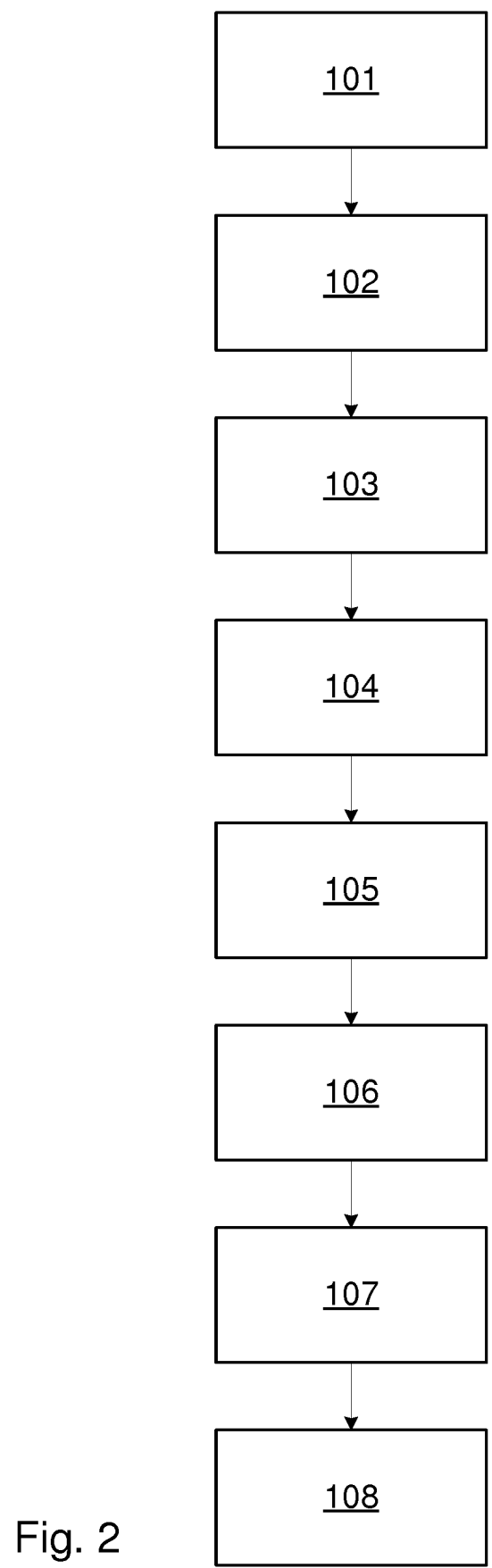
FIG. 2 schematically illustrates a production process.

Referring to FIG. 2, a production process for producing a pulp layer will now be described.

In a first step 101, a pulp slurry layer is provided, e.g. as described with reference to FIG. 1a, wherein a porous pickup tool may be submerged in a pulp slurry with vacuum being applied to a rear side of the pickup tool.

Alternatively, the pulp slurry may be applied to the pickup tool by a coating operation, such as spray coating.

In a second step 102, the pulp slurry layer is transferred from the pickup tool to a first press tool. The transfer may be performed by the pickup tool, or by means of a separate transfer tool, which may have a transfer tool wall portion that is porous. During the transfer step, a vacuum may be applied to the rear side of the transferring tool wall, such that the pulp slurry layer is held to the transferring tool wall. In order to release the pulp slurry layer from the transferring tool wall, it is possible to instead apply pressurized air to the rear side of the transferring tool wall.

Alternatively, the pulp slurry layer may be applied directly to the first press tool. That is, the pulp slurry layer may be formed directly on the first press tool by application of the pulp slurry to the porous forming face of the first press tool. The pulp slurry layer may be applied directly to the first press tool by submerging a tool part of the first press tool, presenting a porous wall portion, in a pulp slurry with vacuum being applied to a rear side of the porous wall portion. Alternatively, the pulp slurry may be applied to the porous forming face of the first press tool by a coating operation, such as spray coating.

In a third step 103, the pulp slurry layer may be pressed in the first press tool, which may comprise a pair of mating tool parts, one of which may have a porous wall portion, which contacts the pulp slurry layer, and through which a vacuum can be drawn.

In this first pressing step 103, a pressure lower than the surrounding ambient pressure is applied at a rear side of the porous wall portion, thus resulting in a vacuum at the rear side of the porous wall portion, causing solvent vapor, such as steam, to be drawn through the tool.

The pressure applied to the rear side of the porous wall portion may be on the order of low or medium level vacuum. That is, the pressure may be more than 1 Pa, but less than ambient pressure. Preferably, the pressure may be on the order of 1 kPa to ambient pressure.

In the first pressing step, a first vacuum level at the rear side of the forming face of the first mold may be about 50-99 kPa, and typically 65-85 kPa.

The forming face of the first mold may be heated to about 150-500° C., preferably 150-400° C., 200-500° C., 200-400° C. or 200-300° C., and in most cases 240-280° C. Typically, all mold faces contacting the pulp slurry layer are heated.

A pressing pressure between mold faces may be on the order of about 390-1570 kPa, and in most cases 580-1170 kPa.

The pressing pressure may be applied during a first pressing time of 0.1-4.0 second, preferably 0.5-2.0 second. In most settings, a pressing time on the order of 0.5-1.5 second is sufficient, and often also 0.5-1 second.

Typically, in this first step, an initial water content of the pulp slurry layer is 70-90% by weight and after the pressing step has been performed, a final water content may be 45-65% by weight, typically about 50-60% by weight.

After the first pressing step 103, the pulp slurry layer, now with a substantial amount of its solvent removed, may be transferred 104 to a second press tool. The transfer 104 may be performed in the same manner as the first transfer step 102, and with similar equipment. The second press tool may be designed essentially as the first press tool.

In a second pressing step 105, the pulp slurry layer may be pressed in the second press tool, which may comprise a pair of mating tool parts, one of which may have a porous wall portion, which contacts the pulp slurry layer, and through which a vacuum can be drawn.

In this second pressing step 105, a pressure lower than the surrounding ambient pressure is applied at a rear side of the porous wall portion, thus resulting in a vacuum at the rear side of the porous wall portion, causing solvent vapor, such as steam, to be drawn through the tool.

However, in the second pressing step 105, the pressure applied at to the rear side of the porous wall portion may be higher than that provided in the first pressing step 103.

In particular, the pressure provided in the first pressing step 103 may be 1-99% of that provided in the second pressing step 105, preferably 50-99% or 90-99%.

In the second pressing step, a second vacuum level at the rear side of the forming face of the second mold may be about 50-99 kPa, and typically 65-85 kPa, but always lower than in the first pressing step.

The forming face of the second mold may be heated to about 110-500° C., preferably 110-400° C., 150-500° C., 150-400° C., 200-500° C., 200-400° C. or 200-300° C., and in most cases 240-280° C. Typically, all mold faces making up the second mold and contacting the pulp slurry layer may be heated.

A pressing pressure between mold faces may be on the order of about 390-1570 kPa, and in most cases 580-1170 kPa.

The pressing pressure may be applied during a second pressing time of 0.1-4.0 second, preferably 0.5-2.0 second. In most settings, a pressing time on the order of 0.5-1.5 second is sufficient, and often also 0.5-1 second.

Typically, in this second pressing step, an initial water content of the pulp slurry layer may be about 45-65%, typically about 50-60% by weight.

A final water content may be about 25-40% by weight, preferably about 30-35% by weight.

After the second pressing step 105, the pulp slurry layer, now with a substantial amount of its solvent removed, may be transferred 106 to a third press tool. The transfer 106 may be performed in the same manner as the first transfer step 102 and/or the second transfer step 104, and with similar equipment. The third press tool may be designed essentially as the first press tool.

In a third pressing step 107, the pulp slurry layer may be pressed in the third press tool, which may comprise a pair of mating tool parts, one of which may have a porous wall portion, which contacts the pulp slurry layer, and through which a vacuum can be drawn.

In this third pressing step 107, a pressure lower than the surrounding ambient pressure is applied at a rear side of the porous wall portion, thus resulting in a vacuum at the rear side of the porous wall portion, causing solvent vapor, such as steam, to be drawn through the tool.

However, in the third pressing step 107, the pressure applied at to the rear side of the porous wall portion may be higher than that provided in the second pressing step 105.

In particular, the pressure provided in the second pressing step 105 may be 1-99% of that provided in the third pressing step 107, preferably 50-99% or 90-99%.

In the third pressing step, a third vacuum level at the rear side of the forming face of the third mold may be about 50-99 kPa, and typically 65-85 kPa, but always lower than in the second pressing step.

The forming face of the third mold may be heated to about 100-400° C., preferably 100-300° C., 150-400° C., 150-300° C., 200-300° C. or 200-280° C., and in most cases 240-280° C. Typically, all mold faces making up the third mold and contacting the pulp slurry layer may be heated.

A pressing pressure between mold faces may be on the order of about 390-1570 kPa, and in most cases 580-1170 kPa.

The pressing pressure may be applied during a third pressing time of 0.1-4.0 second, preferably 0.5-2.0 second. In most settings, a pressing time on the order of 0.5-1.5 second is sufficient, and often also 0.5-1 second.

Typically, in this third pressing step, an initial water content of the pulp slurry layer may be about 25-45% or 25-40% by weight, preferably about 30-40% or 30-35% by weight, and a final water content may be less than about 5% by weight, preferably less than about 1% by weight.

After the third pressing step 107, the pulp slurry layer, now with most of its solvent removed, may be transferred 108 out of the machine.

Optionally, additional steps, such as surface treatment, cutting or printing may be performed on the thus essentially dry product. The product may then be packaged, stored and shipped.

It is noted that the third pressing step 107, and thus also its related transfer step 106, is optional. Hence, the process may be finished after the second pressing step 105 with the output step 108 following immediately.

Thus, in the first pressing step, an initial water content of the pulp slurry layer may be 70-90% by weight and a final water content may be 25-50% by weight, preferably about 30-35% by weight.

In the second pressing step, an initial water content of the pulp slurry layer may be about 25-50%, preferably about 30-35% by weight, and a final water content may be less than about 5% by weight, preferably less than about 1% by weight.

According to the present invention a laminated product is provided, particularly suited for use in packaging, distribution and presentation products which require packaging with additional strength, moisture barrier or gas barrier and/or transparency.

The laminated product may have the form of a tray, a cup, a bowl, a box, a lid, or the like.

FIGS. 3a-3e and 4a-4c schematically illustrate a cross sectional view of a tray 100, 110, 120, 130, 140, which may have a generally square, rectangular, circular or oval shape, and which comprises a rim portion 101, 111, 121, 131, 141, a transition portion 102, 112, 122, 132, 142 and a recessed portion 103, 113, 123, 133, 143.

In the embodiment illustrated in FIG. 3a, the tray 100 is formed of a pair of laminated pulp layers 104, 105, each of which may be produced according to the method illustrated with reference to FIG. 2.

An adhesion layer 106 has been applied only in the rim portion 101, between the pulp layers 104, 105. The adhesion layer may extend over all or part of the rim portion 101.

The adhesion layer 106 may also form a barrier layer.

The adhesion layer 106 may be provided by a glue, a hotmelt and/or an adhesive film.

In the embodiment illustrated in FIG. 3b, the tray 110 is formed of a pair of laminated pulp layers 114, 115, each of which may be produced according to the method illustrated with reference to FIG. 2.

An adhesion layer 116 has been applied over the entire overlap between the pulp layers 114, 115. The adhesion layer may thus extend over all or part of the rim portion 111, over all or part of the transition portion 112 and over all or part of the recessed portion 113.

In the embodiment illustrated in FIG. 3c, the tray 120 is formed of a pair of laminated pulp layers 124, 125, each of which may be produced according to the method illustrated with reference to FIG. 2.

An adhesion layer 126 has been applied over part of the overlap between the pulp layers 124, 125. The adhesion layer may thus extend over all or part of the transition portion 122 and over all or part of the recessed portion 123.

In the embodiment illustrated in FIG. 3d, the tray 130 is formed of a pair of laminated pulp layers 134, 135, each of which may be produced according to the method illustrated with reference to FIG. 2.

Figure 3A:
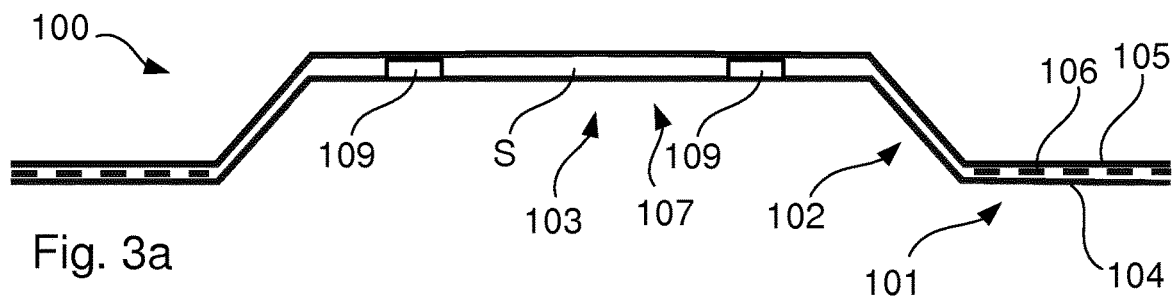
FIGS. 3a, 3b, 3c and 3d schematically illustrate embodiments of a dual pulp layer laminated product.
Figure 3B:
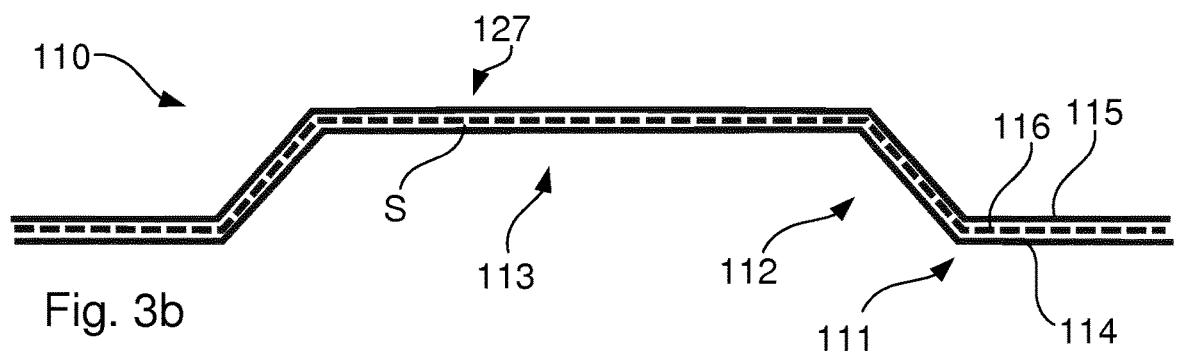
Figure 3C:
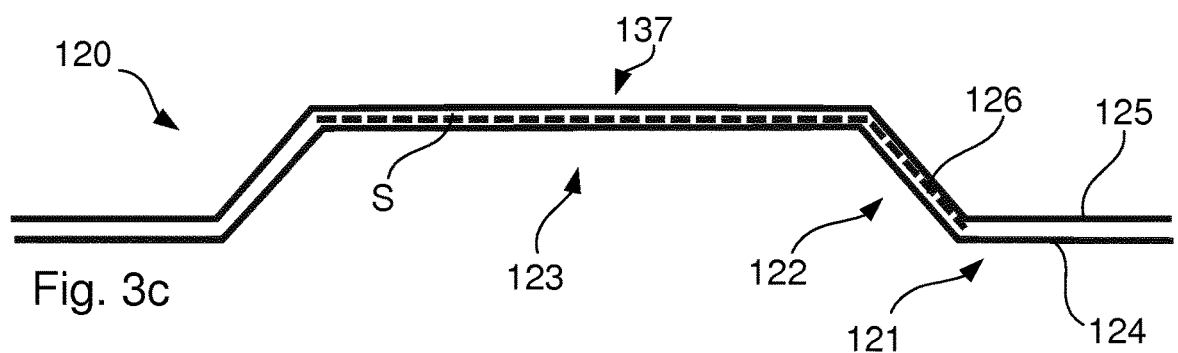
Figure 3D:
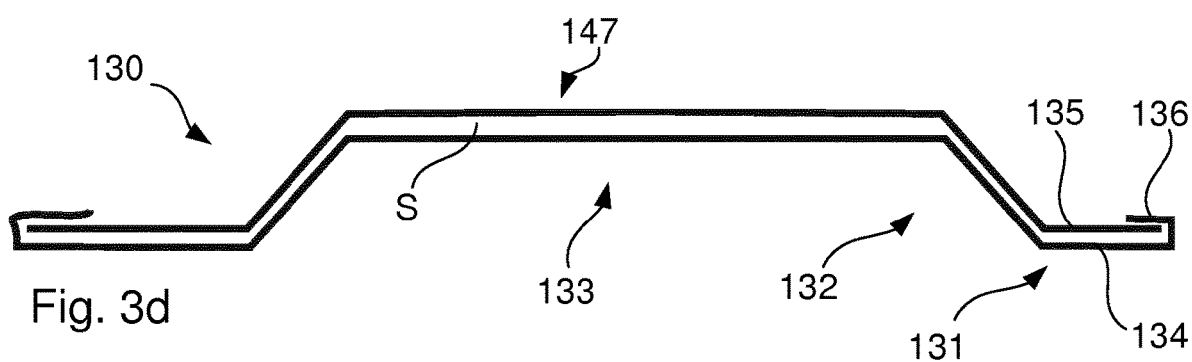

Instead of an adhesion layer as illustrated in FIGS. 3a-3c, or as a supplement to any of the adhesion layer arrangements illustrated therein, a rim portion 136 of one of the pulp layers 134, 135 has been folded over a corresponding rim portion of the other one of the pulp layers 134, 135, so as to form a mechanical connection between the pulp layers 134, 135.

Figure 4A:
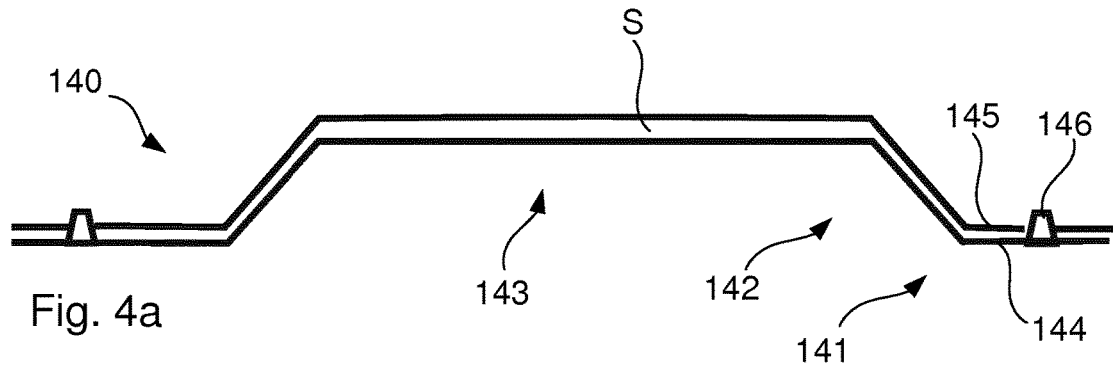
FIGS. 4a-4c schematically illustrate a method of mechanically laminating a dual pulp layer laminated product.
Figure 4B:
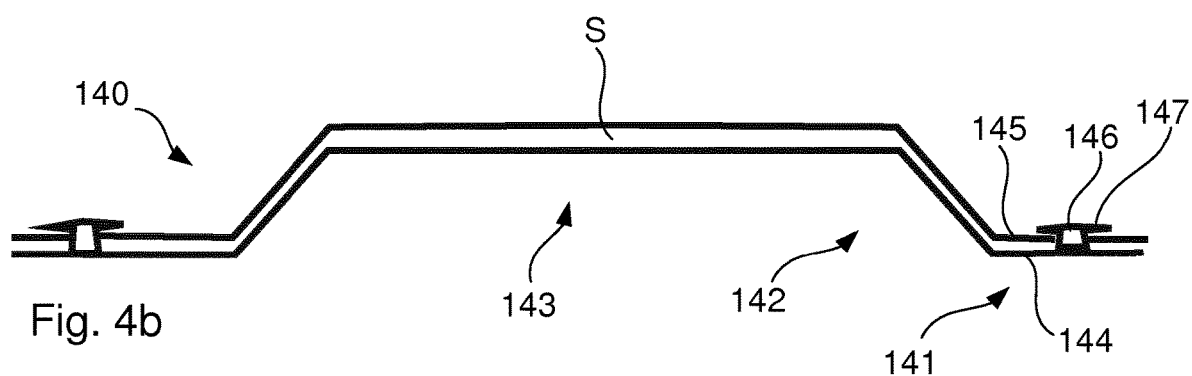
Figure 4C:
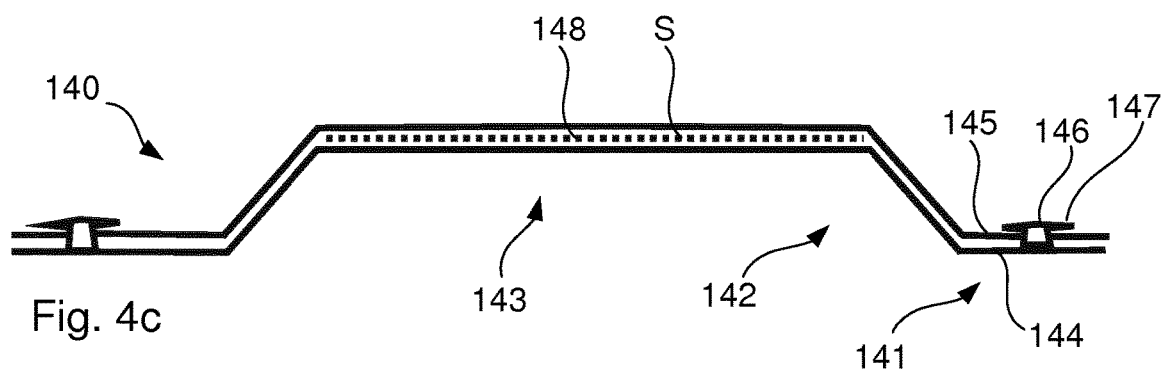

Referring to FIGS. 4a-4c, there will be illustrated a method of mechanically connecting a pair of pulp layers 104, 105.

In the embodiment illustrated in FIG. 4a, the tray 140 is formed of a pair of laminated pulp layers 144, 145, each of which may be produced according to the method illustrated with reference to FIG. 2.

Instead of an adhesion layer as illustrated in FIGS. 3a-3c, or as a supplement to any of the adhesion layer arrangements illustrated therein, a locking structure 146 has been provided on one of the pulp layers 144, 145 and been arranged to protrude through a corresponding through hole in the other one of the pulp layers 144, 145.

The locking structure 146 may be permanently collapsible, e.g. by provision of mechanical force and/or by heating. By permanently collapsing the structure 146 so as to cause it to expand horizontally on the back side of the pulp layer 145 having the through hole, a mechanical connection can be provided.

The collapsible structure may be formed in one piece with the pulp layer 144, as will be described herein, or it may be attached to the pulp layer 144, e.g. mechanically or through adhesion.

Alternatively, or as a supplement, it is possible to add a locking member, which may connect to the locking structure 146 mechanically or by adhesion, and which may provide or supplement the expansion on the back side of the pulp layer 145 having the through hole.

In FIG. 4c, it is illustrated how an additional adhesion/barrier layer 148 may be provided at the recessed portion 143. It is understood that such additional layers 148 may be provided also in the rim portion 141 and/or in the transition portion 142.

While it is possible to laminate the layers 144, 145 so as they contact each other throughout most of the overlap region, another option is to provide a product, which at least over a part of the overlap region presents a space S between the first and second layers. Such a space S may typically have a thickness that is 1-200% of a thickness of the thickest one of the first and second layers, preferably 10-150%. However greater or smaller thicknesses of the space are possible.

The space S may typically extend over about 30-99% of the overlap region. Thus it is possible to provide a laminated product which has thermal insulating properties over all or only a part of the overlap region.

In one group of embodiments, the layers may be connected to each other only at edge portions thereof, with the remainder of the overlap region being free from contact between the layers.

As another option, one or a plurality of spacers 109 may be provided, that may be distributed over the overlap region, in order to maintain the spacing between the layers. At least one, preferably a plurality of, the spacers may be spaced from edge portions of the overlap region.

Such spacers may be provided in any embodiment where a space is desirable.

Figure 5A:
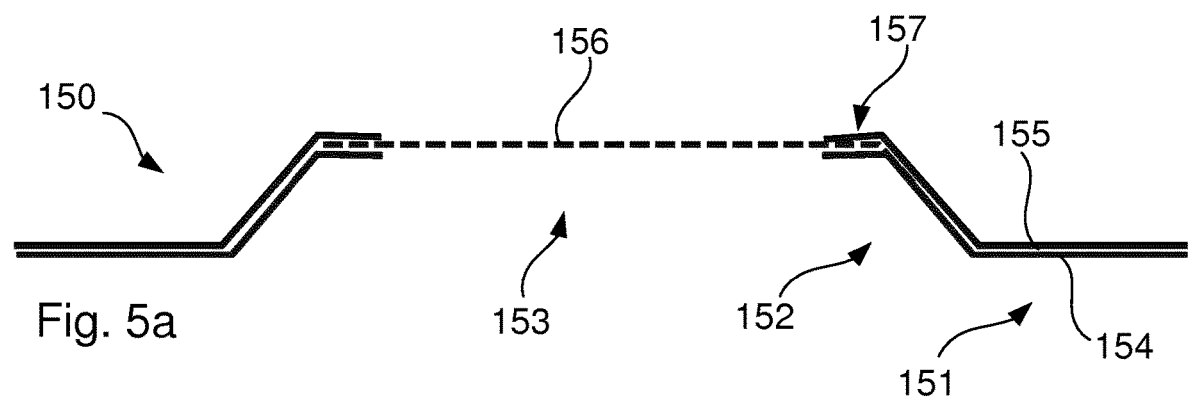
FIGS. 5a-5b schematically illustrate a laminated pulp product having a transparent window.
Figure 5B:
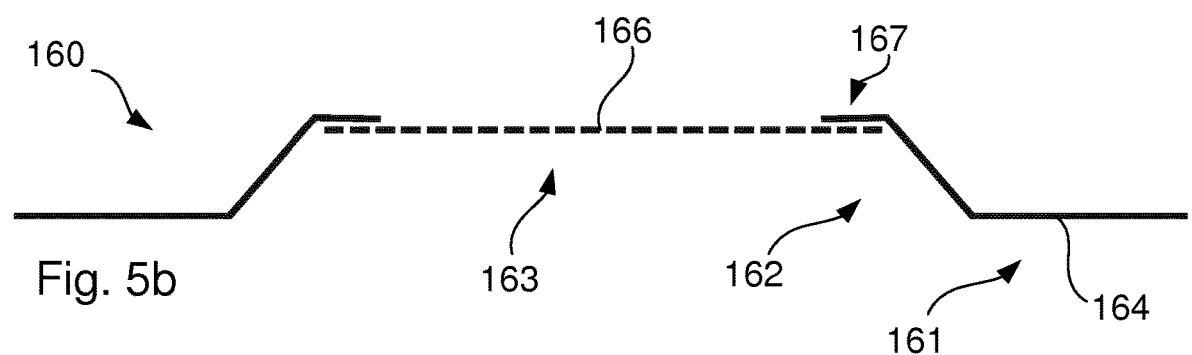

In FIGS. 5a-5b, there is illustrated embodiments of a tray 150, 160 (still used as example structure) having a transparent portion 156, 166, which is laminated to the pulp layer or layers 154, 155; 164.

In FIG. 5a, there is illustrated an embodiment of a tray 150 having the general geometry described above, i.e. with a rim 151, a transition portion 152 and a recessed portion 153. The rim 151 and the transition portion 152 are formed by pulp layers 154, 155, which have been laminated together in any of the manners described above.

In the recessed portion 153, there is provided a transparent window formed by a film 156 of transparent material. The transparent material may be any type of transparent film. Particular examples of films include coated cellulose films, uncoated cellulose films, bio-plastic films, plastic films, or the like.

In an overlap area 157 between the pulp layers 154, 155 and the film 156, the film 156 may be sandwiched between the pulp layers 154, 155 and adhered to one or both of the pulp layers 154, 155. The adhesion may be achieved by means of glue, hotmelt, adhesive film and/or fiber adhesion and/or hydrophilic type bonding, in particular in the case where a cellulose film is being used, such that the cellulose material of the film may bond directly to the pulp material. The latter may be achieved by using a cellulose film wherein the cellulose material is exposed toward the pulp layer to which it is to be bonded. Such exposure may be achieved by using an uncoated film, or a coated film from which a coating layer has been partially removed in the overlap area 157, mechanically or chemically.

In order to achieve such bonding, it is possible to allow an uncoated portion of a cellulose film to overlap and contact a still wet portion of pulp material. The overlapping portion may then be subjected to pressing and/or heating, as per the process disclosed in FIG. 2.

The cellulose film may be pretreated, such as to soften it. In the case where the film is coated, such coating may be chemically and/or mechanically removed to such an extent as to allow fiber bonding to occur.

The cellulose film may be introduced at any stage during the process disclosed in FIG. 2.

As a first example, the cellulose film may be introduced already prior to the pick-up stage 101. For example, the cellulose film, which may have been preformed, may be arranged on the pickup tool and held in place by the vacuum drawn through the forming surface of the pickup tool, whereby the cellulose film is immersed into the slurry during the pickup step 101.

As a second alternative, the cellulose film, optionally preformed and optionally softened, may be introduced immediately after the pickup step 101, so as to be directly brought into contact with the wet pulp slurry picked up by the pickup tool. Alternatively, the cellulose film may be introduced in the transfer step 102.

As yet further alternatives, the cellulose film, optionally preformed and optionally softened, may be introduced during any of the forming steps 103, 105, 107.

Adhesive may be added to provide or enhance the bond between the pulp and the cellulose film.

As yet another alternative, the film may be from another material than cellulose film, such as a plastic film or biodegradable film. In such case, the film may nevertheless be introduced during any step of the process, but perhaps with a preference towards the latter steps 105, 107 of the process. Moreover in the case the film is from another material than cellulose film, the provision of an adhesive may be of greater significance.

Referring to FIG. 5b, there is illustrated an embodiment of a tray 160 having the general geometry described above, i.e. with a rim 161, a transition portion 162 and a recessed portion 163. The rim 161 and the transition portion 152 are formed by a single pulp layer 164.

In the recessed portion 163, there is provided a transparent window formed by a film 166 of transparent material. The transparent material may be any type of transparent film. Particular examples of films include coated cellulose films, uncoated cellulose films, bio-plastic films, plastic films, or the like.

In an overlap area 167 between the pulp layer 164 and the film 166, the film 166 may be adhered to the pulp layer 164 in the same manner as described with respect to FIG. 5a.

The film 166 may be adhered to an inside or outside of the pulp layer 164. For example, the film may be adhered to a side of the pulp layer 164 that is intended not to be outwardly exposed. For example, the film may be adhered to a side of the pulp layer 164 that is intended to contact a product contained in or held by the tray 160.

The overlap area 167 may extend only along a rim of the window formed by the film 166. Alternatively, the overlap area may extend over all, or a substantial part, of the relevant surface of the pulp layer, e.g. so as to provide a barrier layer on that surface of the pulp layer. For example, in a tray 160, the film 166 may extend over the entire recessed part 163 and over the transition part 162 as well. The film 166 may optionally extend over all or part of the rim part 161.

Figure 6A:
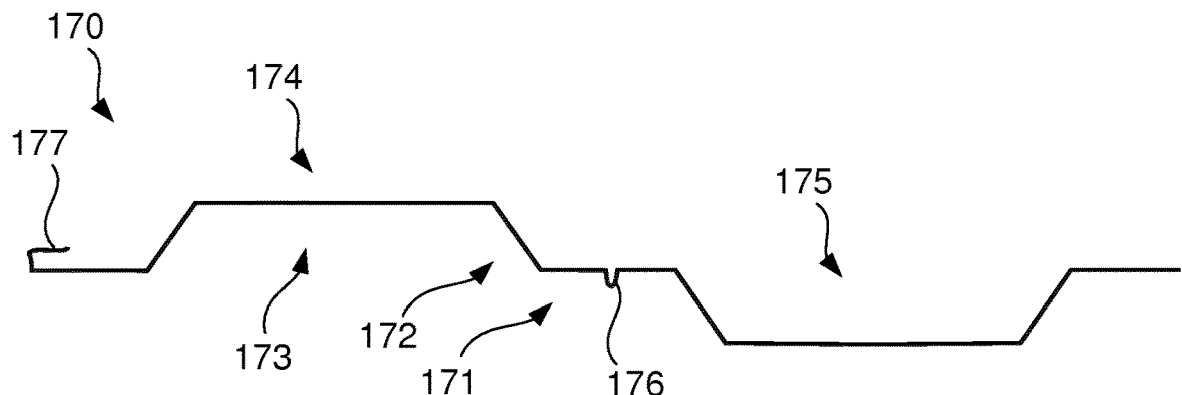
FIGS. 6a-6c schematically illustrate a method of producing a dual layer laminated pulp product, which is produced in one piece.
Figure 6B:
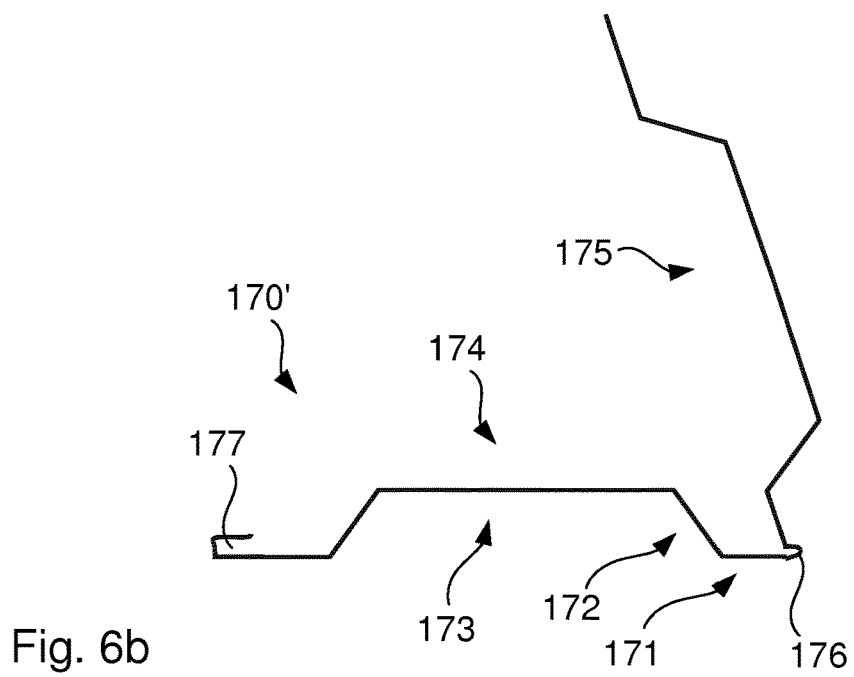
Figure 6C:
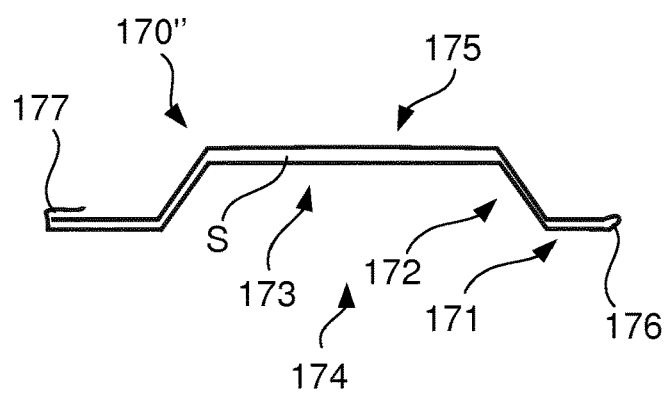

FIGS. 6a-6c schematically illustrate another way of producing a tray 170, 170', 170" comprising a pair of laminated pulp layer portions 174, 175. As is illustrated in FIG. 6a, both layer portions 174, 175 can be produced in one piece, with a hinge portion 176 and optionally a locking portion 177.

In the illustrated example, both layer portions 174, 175 present a respective rim portion 171, a transition portion 172 and a recessed portion 173.

As an alternative, one of the layers may present only a subset of such portions 171, 172, 173.

For example, a first layer portion 174 may present a rim portion 171, transition portion 172 and recessed portion 173, while a second layer portion 175 presents only a rim portion, such that a reinforced rim portion is provided.

As is illustrated in FIG. 6b, the pulp layer portion 174, 175 may be folded together about the hinge 176, so as to form the structure 170" illustrated in FIG. 6c.

In the case where a mechanical locking portion 177 is provided, this may, as a non-limiting example, be provided according to the disclosure referring to FIG. 3d or 4a-4c.

As another option, an adhesion layer (not shown) may be provided between the pulp layer portions 174, 175 in any of the manners disclosed referring to FIGS. 3a-3c It is also noted that a window portion (not shown) may be provided according to the disclosure according to FIG. 5a or 5b.

Figure 7A:
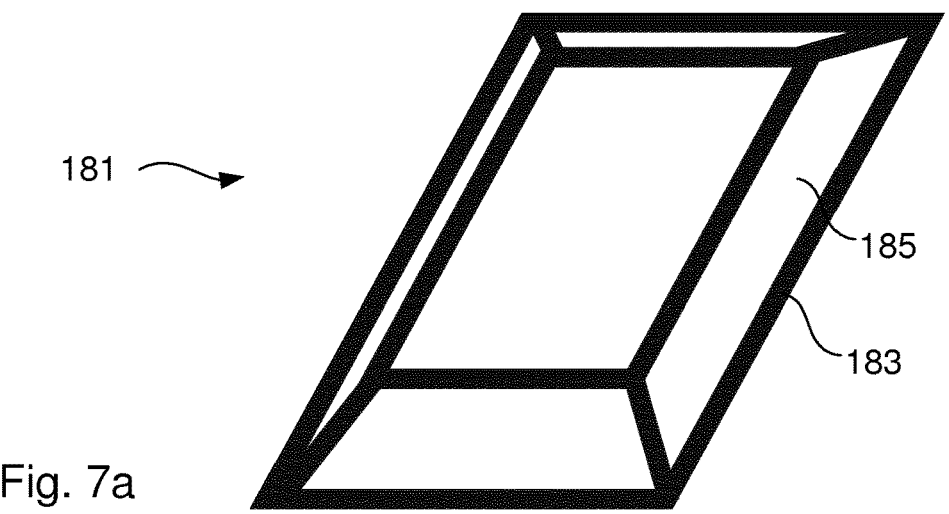
FIGS. 7a, 7b and 7c schematically illustrate a method of producing a reinforced transparent laminated product.
Figure 7B:
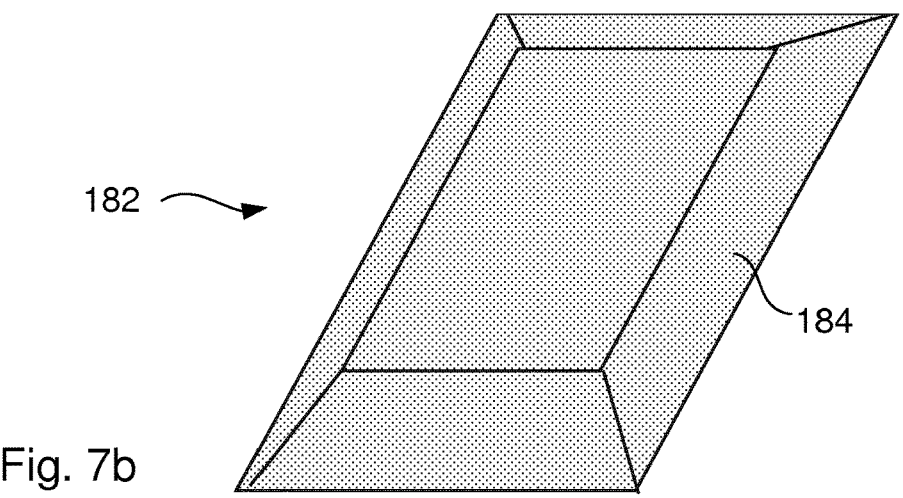
Figure 7C:
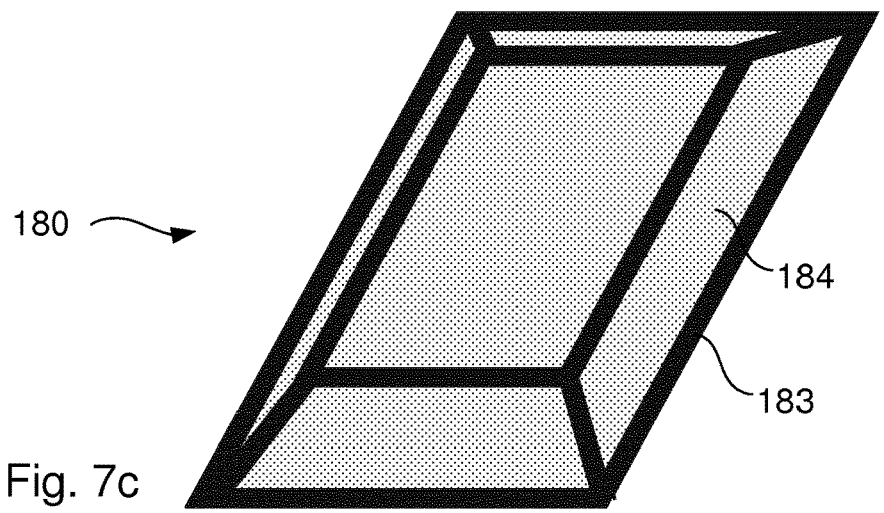

FIGS. 7a-7c schematically illustrate a method of making a product, such as a tray 180, having predominantly transparent walls.

In FIG. 7a, there is illustrated a tray frame 181, which is comprises a number of frame members 183 that form a three-dimensional frame or skeleton. The frame 181 may be produced as single layer pulp product as per the method disclosed with respect to FIG. 2, or as a laminated product composed of two or more pulp and/or film layers as per the disclosure of e.g. FIGS. 3a-3c.

The frame members 183 span one or more windows 185. The windows may be planar and thus two-dimensional, as illustrated, or they may be single or double curved.

FIG. 7b schematically illustrate a film or sheet body 182, which may be pre-formed to attain a shape that will fit to a predetermined side of the frame 181. The film or sheet body 182 may have a three-dimensional shape and it may comprise one or more sections 184, each of which may be planar and two-dimensional. Alternatively, one or more sections may be single or double curved.

The film or sheet body 182 may be formed of any thin material, such as paper, plastic or cellulose film. Typically, the body 182 will be of a material that has sufficiently low rigidity or thickness not to enable it to be self-supporting. Moreover, the film or sheet body 182 may be pre-formed, for example through a sheet molding process. Such a process may utilize heat and/or solvent to render the film or sheet pliable for the forming, after which a drying, curing or cooling step may be provided to cause the film or sheet to keep its given shape.

Alternatively, a casting or injection molding process may be used to provide the shape of the body 182.

FIG. 7c schematically illustrates the assembled product 180, composed of the frame 181 and the sheet or film body 182. In the illustrated example, the sheet or film body 182 is fitted to an inside of the tray.

The frame 181 and the sheet or film body 182 may be laminated to each other in any of the manners previously disclosed.

It is noted that a pair of frames 181 may be provided so as to sandwich the film body 182 between the frames 181 (not illustrated), similar to the embodiments of FIG. 5a. In such case, frame parts may be produced in one piece as illustrated in FIGS. 6a-6c.

FIGS. 8a-8b and 9a-9d schematically illustrate a method of producing a locking device that can be used for mechanically laminating or otherwise interconnecting a pair of pulp layers, such as the ones disclosed FIGS. 3a-3d, 4a-4c, 5a-5b, 6a-6c or 7a-7c.

Figure 8A:
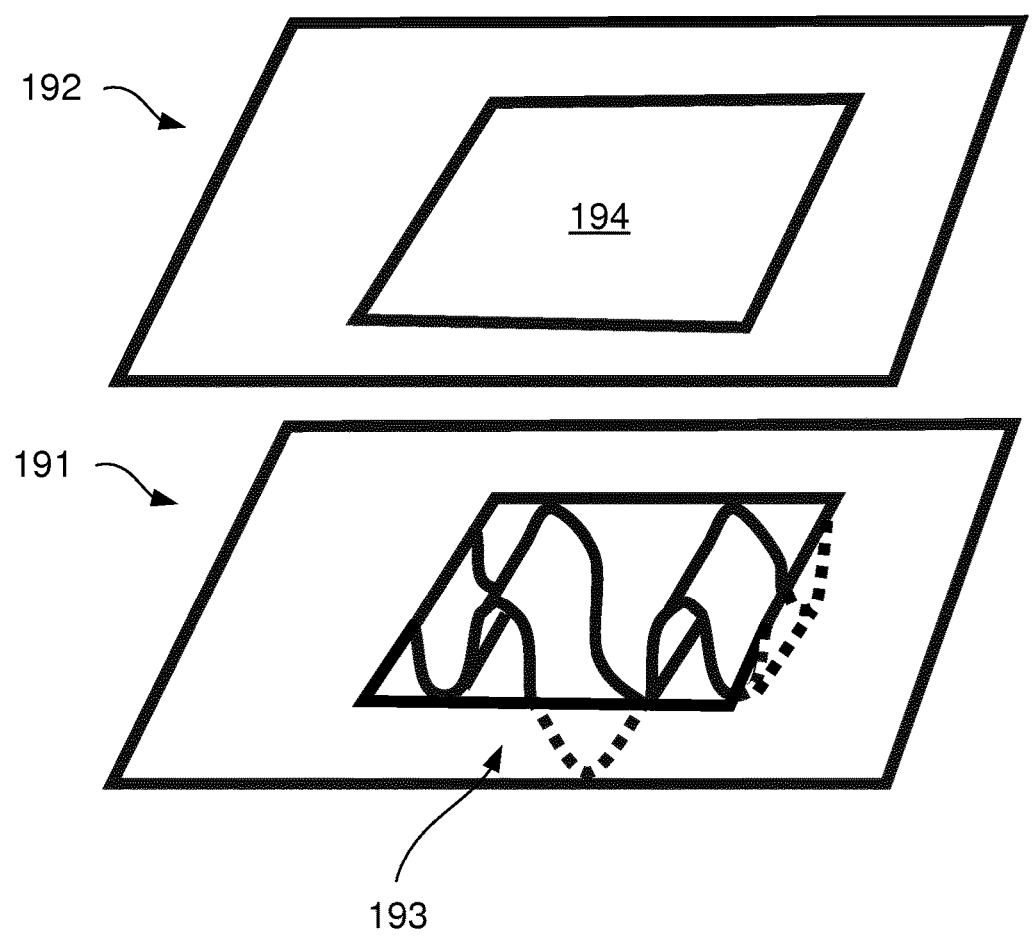
FIGS. 8a-8b schematically illustrate a method of mechanically interconnecting a pair of laminated pulp layers.

In FIG. 8a, there is illustrated a first member 191 having a locking device 193 integrally formed therein and a second member 192 having a through hole 194 formed therein.

The first member 191 may be a material having the ability to plastically deform or to cure or otherwise set, so as to maintain a given shape. For example, the first material may be formed from a pulp material according to the process of FIG. 2.

The second member 192 may be any sheet material, including a pulp material like the first member 191. However, the second member 192 may suitably be formed from another material, such as paper or transparent film as per the above disclosure.

Figure 8B:
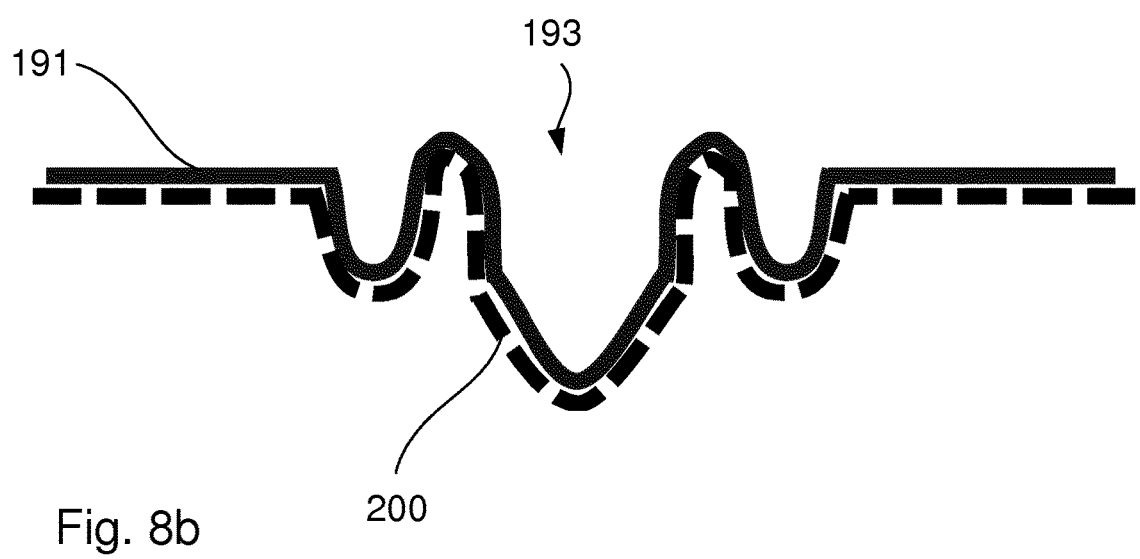

In FIG. 8b, there is illustrated how the locking device 193 may be formed by means of a mold 200. Such a mold 200 may be used to form a pulp material as per FIG. 2, or a polymer material.

In FIGS. 9a-9d, there is illustrated an example of a design and operation of the locking device 193.

Figure 9A:
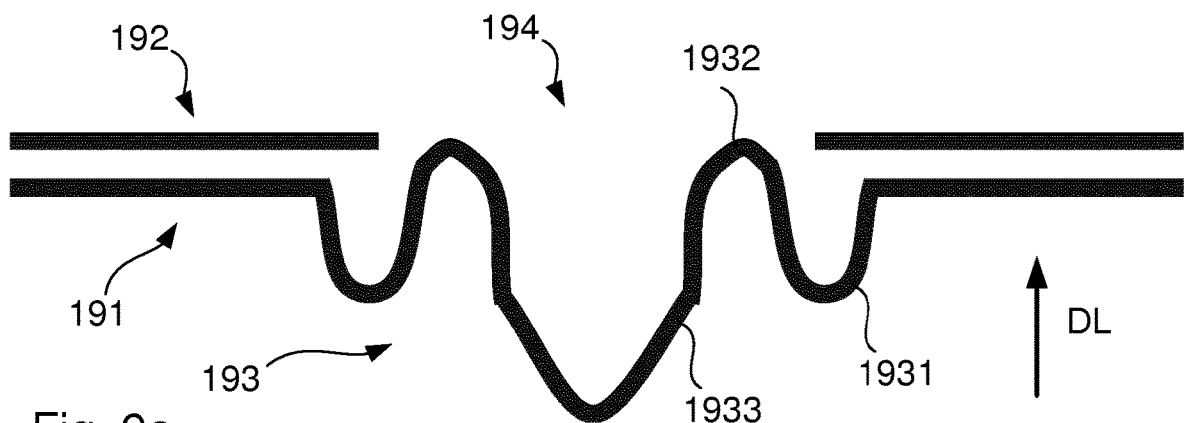
FIGS. 9a-9d schematically illustrate a method for carrying out the lamination illustrated in FIGS. 8a-8b.

Referring to FIG. 9a, the locking device is formed in a first member 191 and comprises, as seen from the lamination side (the side against which the locking device is to attach the sheet 192) an outer generally concave portion 1931, a generally convex portion 1932 and an inner generally concave portion 1933.

The outer concave portion 1931 connects to the first member 191 at an outer pivot portion 1934. This outer pivot portion may be arranged outside an edge of the corresponding hole 194 of the second member 192. A depth in lamination direction DL (normal to the plane of the locking device) of the outer concave portion 1931 may correspond to at least 110%, preferably 150-250%, of a distance between the pivot portion 1934 and its associated edge of the hole 194.

Figure 9B:
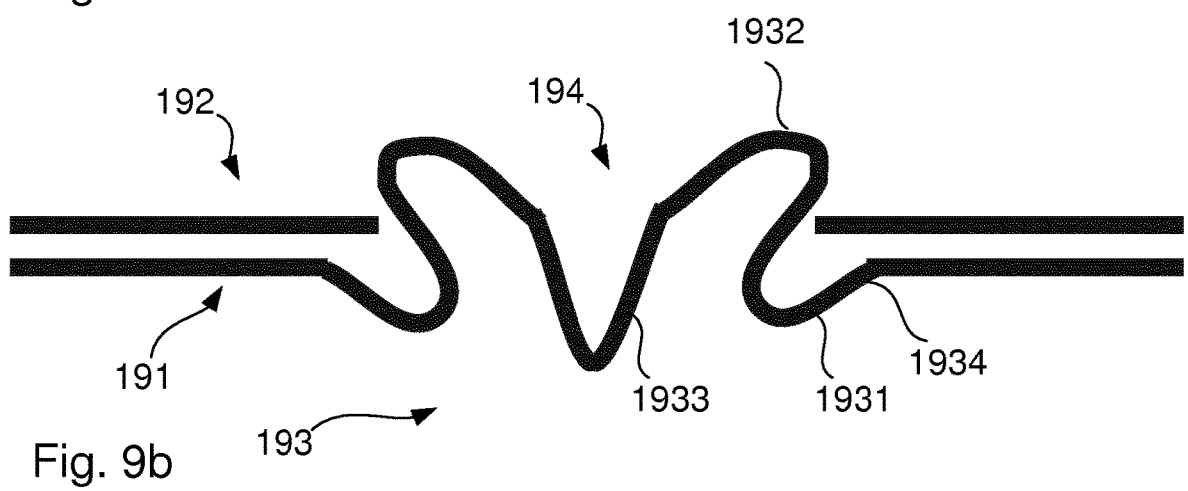
Figure 9C:
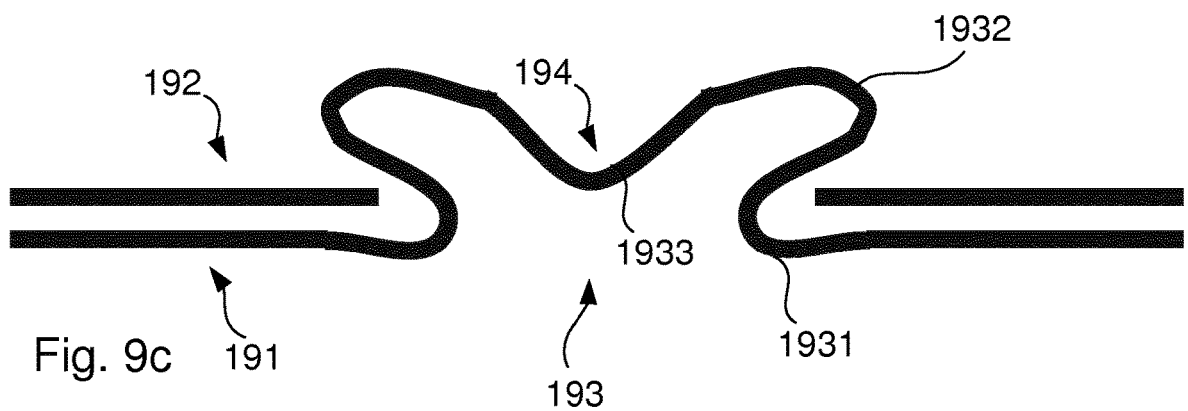

While FIG. 9a illustrates the locking device 193 as formed, i.e. in its pristine shape, FIGS. 9b-9c schematically illustrates the process of activating the locking device so as to lock the second member 192 to the first member 191.

In FIG. 9b, a force towards the lamination direction DL is applied to the inner concave portion 1933, such that this is pushed towards the through hole 194, whereby the outer concave portion 1931 is caused to rotate about the pivot portion 1934. At this point, the outer concave portion 1931 may substantially maintain its shape. At least one of the convex portion 1932 and the outer concave portion 1931 may become deformed during this phase. In the illustrated example, it is the inner concave portion 1933 that is deformed by being compressed in a direction perpendicular to the lamination direction DL.

In FIG. 9c, the inner concave portion 1933 has been pushed entirely through the through hole 194 in the second member 192. At this point, the inner concave portion 1933 has begun to become deformed by being expanded in the direction perpendicular to the lamination direction DL. At this point, the outer concave portion 1931 and the convex portion 1932 may maintain their shapes.

Figure 9D:
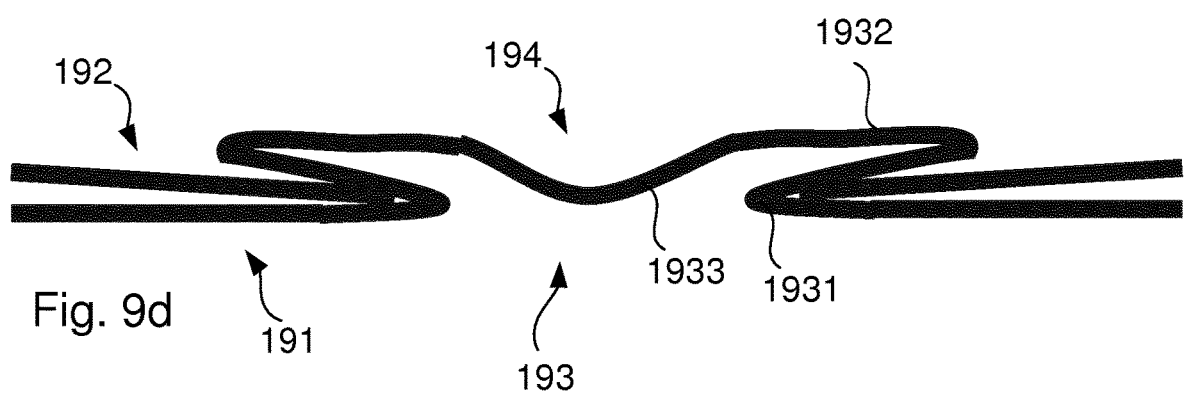

In FIG. 9d, a force has been applied onto the convex portion 1932 and/or the outer concave portion 1931 in the direction opposite to the lamination direction, optionally while maintaining the inner concave portion 1933 at its position in the lamination direction DL. At this point the outer concave portion 1931 and the convex portion 1932 are being deformed by being compressed in the lamination direction DL, such that the edge of the through hole 194 is clamped by the outer concave portion 1931.

As is understood from the above, the inner concave portion 1933 may be generally flexible, so as to be able to deform freely. It may be advantageous if the inner concave portion 1933 is also able to maintain a given state of deformation. However, the fact that it may have to deform twice and towards different directions (a contraction followed by an expansion), it may be advantageous to form the inner concave portion 1933 so as to be mainly flexible.

The outer concave portion 1931 and the convex portion 1932 may be designed so as to maintain any state of deformation, since they only need to undergo a single deformation, at the last stage of the activation of the locking device 193.

It is understood that the locking device may be integrated with the first member, or it may be provided as a separate part, which can be activated to clamp two or more members together.

By applying a wet pulp material to a porous forming surface of a first mold part. The method further comprises applying a transparent cellulose film sheet to at least partially overlap and contact the pulp material. The method further comprises forming the product by pressing the cellulose film sheet and the pulp between the first mold part and a second mold part while heating at least one of the mold parts and/or drawing vacuum through at least one of the mold parts, so as to evacuate water from the product.

The second layer may typically be one or more of a cellulose film (coated, partially coated or uncoated), such as cellophane, a bio-plastic film, a plastic film, a cut or sheeted paper, an RFID chip or other similar integrated circuits or printed electronics, a tear strip or a reinforcing sheet or web.

A film may be pre-treated prior to lamination. For example, a cellulose film may be softened by a solvent, such as water, depending on what type of bonding is intended to be used.

Adhesives may be applied to all or part of one or both parts that are to be laminated.

A film may be preheated, chemically treated and/or mechanically treated to enhance lamination properties.

Potentially suitable films include metallocene and octane LLDPE and LDPE films, which optionally may include suitable additives, such as dyes, etc.

Other films may be single-layer or multi-layer films including PE, APET, PP, PVC, metallic foils and paper.

Adhesives useful in the present disclosure include dextrin based glues, such as Aquence® OC EME (provided by Henkel Brands).

Another useful adhesive may be PVOH based adhesives, which may be hydrolysed or non-hydrolysed, such as Aquence® LAM 1090 (provided by Henkel brands).

The invention claimed is:

1. A laminated biodegradable product, comprising:
   a first functional layer in the form of a three-dimensional molded pulp structure,
   a second functional layer of a cellulose film selected from the group consisting of an uncoated cellulose film, a partially coated cellulose film, and a coated cellulose film from which a coating layer has been partially removed, and
   an overlap region, in which the first functional layer and the second functional layer overlap each other at an uncoated portion of the cellulose film;
   wherein the first functional layer and second functional layer are connected to each other by adhesion achieved based on a hydrogen bond or fiber bonding.

2. The laminated product as claimed in claim 1, wherein the second layer forms a surface barrier on at least part of the first layer.

3. The laminated product as claimed in claim 1, wherein the laminated product presents a portion of no overlap between the second layer and the first layer.

4. The laminated product as claimed in claim 1, wherein the second layer is three-dimensionally molded.

5. A method of producing a laminated biodegradable product, comprising:
   providing a first three dimensionally molded functional pulp layer,
   providing a second functional layer of a cellulose film selected from the group consisting of an uncoated cellulose film, a partially coated cellulose film, and a coated cellulose film from which a coating layer has been partially removed,
   arranging the first functional layer and second functional layer so as to at least partially overlap, allowing an uncoated portion of the cellulose film to overlap and contact a wet portion of the pulp material, and
   connecting the first functional layer and second functional layer to each other by removing water from the product during a forming process such that the cellulose film and the pulp material bond to each other by adhesion achieved based on a hydrogen bond or fiber bonding.

6. The method as claimed in claim 5, wherein joining the first and second layers comprises positively interlocking portions of the first and second layers.

7. The method as claimed in claim 5, wherein the method further comprises arranging the first and second layers so as the laminated product presents a portion of no overlap between the second layer and the first layer.

8. The method as claimed in claim 5, wherein connecting the first functional layer and second functional layer to each other comprises forming the product by pressing the second functional layer of cellulose film and the first three dimensionally molded functional pulp layer between a first mold part and a second mold part while heating at least one of the mold parts and/or drawing vacuum through at least one of the mold parts, so as to evacuate water from the product.

9. The method as claimed in claim 8, wherein the cellulose film sheet is applied to the first mold part prior to application of the pulp material to the first mold part or after application of the pulp material.

10. The method as claimed in claim 8, further comprising selectively applying the wet pulp material to an active forming surface of a mold part, such that a first portion of the active forming surface is essentially free from pulp and a second portion of the active forming surface presents a continuous layer of the wet pulp material.

11. The method as claimed in claim 8, wherein a vacuum level at a rear side of a forming face of the mold part is 50-99 kPa.

12. The method as claimed in claim 8, wherein a forming face of the mold part is heated to 150-500° C.

13. The method as claimed in claim 8, wherein the pulp is pressed against a forming face of the mold part with a pressure of 390-1570 kPa.

14. The method as claimed in claim 8, wherein the pulp is pressed against a forming face of the mold or mold part during a pressing time of 0.1-4.0 second.

15. The method as claimed in claim 8, wherein the forming is a first forming step, wherein an initial water content of the pulp is 70-90% by weight and wherein a final water content is 45-65% by weight.

16. The method as claimed in claim 8, wherein the forming is a second forming step, wherein an initial water content of the pulp is 45-65% by weight, and wherein a final water content is 25-40% by weight.

17. The method as claimed in claim 8, wherein the forming is a third forming step, wherein an initial water content of the pulp is 25-45% by weight, and wherein a final water content is less than 5% by weight.

18. The method as claimed in claim 8, further comprising at least one step of pre-forming at least part of the product by pressing at least some of the pulp between a first preforming mold part and a second preforming mold part, while heating at least one of the preforming mold parts and/or drawing vacuum through at least one of the preforming mold parts, so as to evacuate water from the product.

19. The method as claimed in claim 8, further comprising at least one step of post-forming at least part of the product by pressing at least some of the pulp between a first post-forming mold part and a second post-forming mold part, while heating at least one of the post-forming mold parts and/or drawing vacuum through at least one of the post-forming mold parts, so as to evacuate water from the product.

20. The method as claimed in claim 8, wherein a final water content between a pair of juxtaposed portions of the first layer differs by at least 5% by weight.

\* \* \* \* \*